US006481662B1

(12) United States Patent
Kles et al.

(10) Patent No.: US 6,481,662 B1
(45) Date of Patent: Nov. 19, 2002

(54) FIBER OPTIC CABLE WINDING ASSIST TOOL

(75) Inventors: Gary Kles, Sykesville; Bradley Paul Davidson, Joppa; Edward Joseph Jablonski, Cockeysville, all of MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/915,988

(22) Filed: Jul. 26, 2001

(51) Int. Cl.[7] ............................. B65H 75/44; G02B 6/08
(52) U.S. Cl. ..................................... 242/400.1; 385/135
(58) Field of Search ............................. 242/388, 388.6, 242/398, 400.1, 405.1, 395, 591, 404, 404.2, 129, 399; 385/123, 134, 135, 136, 137

(56) References Cited

U.S. PATENT DOCUMENTS

| | | | | |
|---|---|---|---|---|
| 5,109,983 A | * | 5/1992 | Malone et al. ............... | 385/135 |
| 5,167,001 A | * | 11/1992 | Debortoli et al. ........... | 385/135 |
| 5,724,469 A | * | 3/1998 | Orlando ....................... | 385/135 |
| 5,734,774 A | * | 3/1998 | Morrell ........................ | 385/134 |
| 6,076,755 A | * | 6/2000 | Talamini ..................... | 242/398 |
| 6,175,079 B1 | * | 1/2001 | Johnston et al. | |
| 6,215,938 B1 | * | 4/2001 | Reitmeier et al. .......... | 385/134 |
| 6,259,852 B1 | * | 7/2001 | Daoud et al. ................ | 385/134 |
| 6,289,160 B1 | * | 9/2001 | Daoud .......................... | 385/135 |
| 6,301,424 B1 | * | 10/2001 | Hwang ......................... | 385/134 |
| 6,353,696 B1 | * | 3/2002 | Gordon et al. ............... | 385/135 |

FOREIGN PATENT DOCUMENTS

DE        40 10 027 A1  *  4/1991

* cited by examiner

Primary Examiner—William A. Rivera
(74) Attorney, Agent, or Firm—Michael R. Cammarata; James M. Olsen

(57) ABSTRACT

A fiber optic cable winding assist tool for securing, routing, and storing fiber optic cables in optical communications systems that quickly and simultaneously lifts the retainer fingers of a mandrel, without breaking them, and releases the retainer fingers once the fiber optic cables are safely within the retainer fingers. The winding assist tool is used with a base having at least one mandrel connected thereto, and may have a spacer disk connected to the mandrel. A spider frame is provided on the spacer disk or mandrel and includes a body portion and arm portions extending from the spider frame body portion. Each arm portion engages a corresponding retainer finger of the mandrel. A thumb screw having a head portion and a threaded portion mates with a threaded opening provided through the spider frame body portion and engages a top surface of the spacer disk. An operator need only rotate the thumb screw, and the threaded portion forces the spider frame upwards, which in turn simultaneously lifts the retainer fingers. With the retainer fingers in a raised position, the operator may wind a fiber optic cable around the mandrel. Once the operator ensures that the fiber optic cable is safely within the retainer fingers, the operator may rotate the thumb screw in an opposite direction, and the threaded portion lowers the spider frame, which in turn, simultaneously lowers the retainer fingers. This prevents the fiber optic cable from being pinched and potentially damaged by a retainer finger.

22 Claims, 3 Drawing Sheets

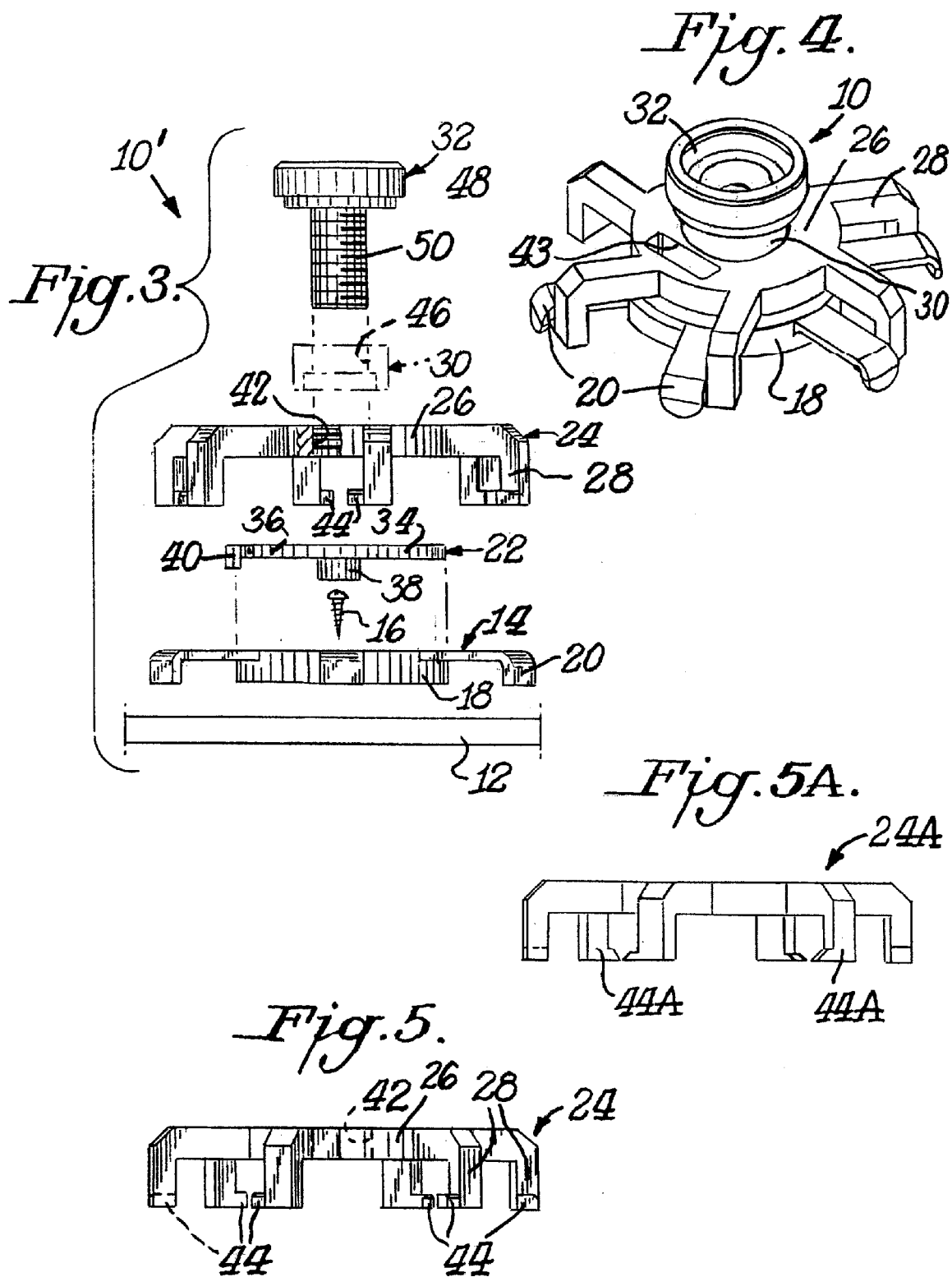

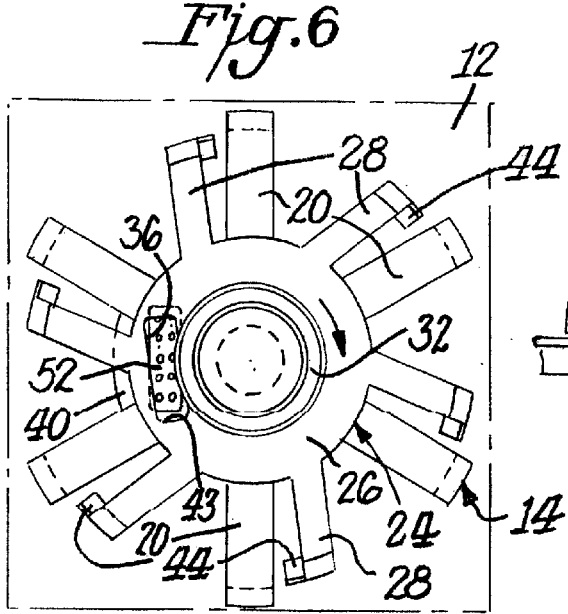
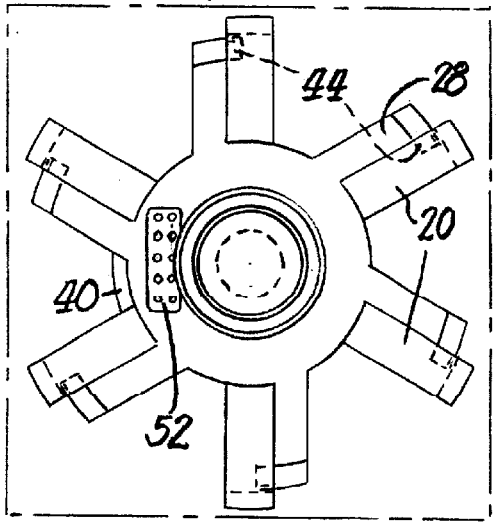
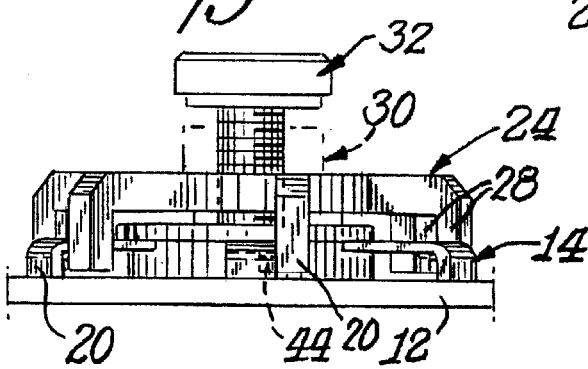
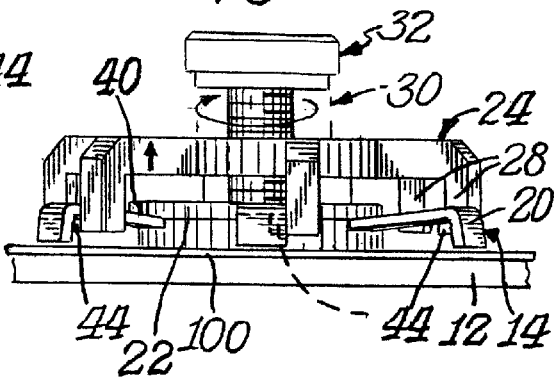
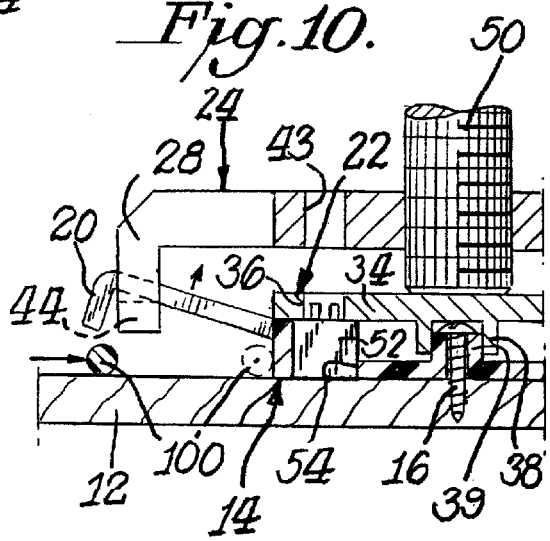
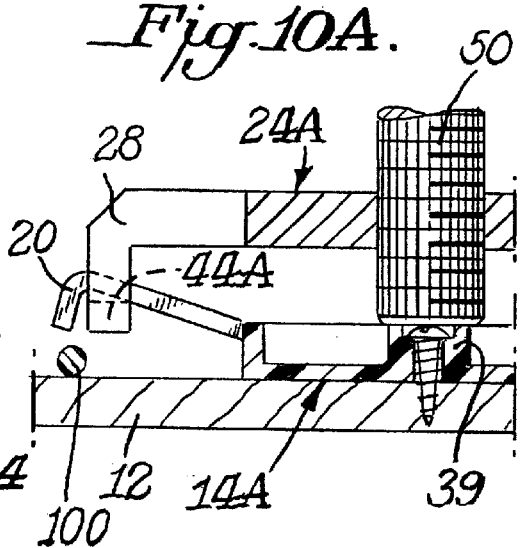

FIBER OPTIC CABLE WINDING ASSIST TOOL

BACKGROUND OF THE INVENTION

A. Field of the Invention

The present invention relates generally to the communications field, and, more particularly to a fiber optic cable winding tool for securing lengths of fiber optic cables used in the communications field.

B. Description of the Related Art

Most communication equipment is designed to be interconnected with communication cables having predetermined lengths. However, many interconnected components of a communication system are more proximate to each other than the length of the communication cable interconnecting the components. Thus, it is a problem in the field of communication cable installation to store the extra length of communication cables without damaging the communication cables by the provision of tight bends, or inappropriate use of fasteners, or inadequate support to the communication cables. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable.

This problem is further heightened when fiber optic cables are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fibers contained in the cable, and the shorter the life span of the cable.

For example, in a telephone switching office, the various switching components are split onto different printed circuit boards (PCBs). Fiber optic cables may be used to route the signals between the different PCBs or between components on a single PCB. In a conventional arrangement, the PCB is generally placed in a shelf or rack alongside other such PCBs.

The fiber optic cables are used for transferring signals between reception ports and electro-optical converters provided on the PCB or PCBs. The fiber optic cables generally come in three and six foot lengths with connectors provided at the ends thereof However, the PCB may have a width of only several inches. To accommodate for the extra length of the fiber optic cables, such cables are routed around and secured to the PCB via a plurality of clips. The clips are secured to the PCB via holes drilled through the PCB.

The fiber optic cables are generally routed, by hand, through the clips, without bending the fiber optic cables beyond the minimum bend radius. Whether this requirement is satisfied depends on the individual operator doing the assembly. The fiber optic cables ideally should be routed in to prevent stress being applied to the cables.

Unfortunately, conventional clips increase the stress applied to the cables. They are made of hard materials, and are always either open, locked closed, or gated. Rigid closed or gated clips may break or damage the fiber optic cable when the cable is forced into or pinched by such clips. Such clips may also create latent defects in the fiber optic cable that do not surface until after the PCB is in operation. Rigid open clips do not present such a problem, but typically hold only a single cable and fail to adequately retain the cable in the clip. Furthermore, conventional clips are often difficult to use, and too large and generic to work in new, denser communications systems.

Thus, there is a need in the art to provide a means for securing and routing fiber optic cables in optical communications systems that may be quickly and easily utilized by an operator and prevent the fiber optic cables from being damaged or bent beyond their minimum bend radii.

SUMMARY OF THE INVENTION

The present invention solves the problems of the related art by providing a fiber optic cable winding tool for securing and routing fiber optic cables in optical communications systems by quickly lifting the retainer fingers of a mandrel, without breaking or damaging the retainer fingers, and releasing the retainer fingers once the fiber optic cables are safely within the retainer fingers.

In accordance with the purpose of the invention, as embodied and broadly described herein, the invention comprises a fiber optic cable winding tool including: a mandrel having a hub portion and a plurality of retainer fingers extending away from the hub portion, wherein at least some of the retainer fingers are configured to retain a portion of a fiber optic cable between the configured retainer fingers and a base.

Further in accordance with the purpose of the invention, as embodied and broadly described herein, the invention comprises a winding assist tool including: a spider frame having a body portion and a plurality of arm portions extending from the body portion, at least some of the plurality of arm portions of said spider frame engage a corresponding retainer finger of a mandrel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an exploded view of the individual components of a fiber optic cable winding assist tool in accordance with another embodiment of the present invention;

FIG. 4 is a perspective view of the fiber optic cable winding assist tool shown in FIG. 3;

FIG. 5 is a rear elevational view of a spider frame of the fiber optic cable winding assist tool shown in FIGS. 3 and 4;

FIG. 5A is a rear elevation view of another spider frame of the fiber optic cable winding assist tool shown in FIGS. 3 and 4;

FIG. 6 is a top plan view of the fiber optic cable winding assist tool shown in FIGS. 3–5, and showing the spider frame before engagement with the retainer fingers of the mandrel;

FIG. 7 is a top plan view of the fiber optic cable winding assist tool shown in FIGS. 3–6, and showing the spider frame engaged with the retainer fingers of the mandrel;

FIG. 8 is a front elevational view of the fiber optic cable winding assist tool shown in FIGS. 3–7, and showing the spider frame engaged with the retainer fingers of the mandrel;

FIG. 9 is a front elevational view of the fiber optic cable winding assist tool shown in FIGS. 3–8, and showing the spider frame simultaneously lifting the retainer fingers of the mandrel;

FIG. 10 is an exploded cross-sectional view in elevation of a portion of the fiber optic cable winding assist tool shown in FIGS. 3–9, and showing the spider frame raising one of the retainer fingers of the mandrel; and FIG. 10A is an exploded cross-sectional view in elevation of a portion of a fiber optic cable winding assist tool in accordance with another embodiment of the present invention.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

As used herein, the term "winding" is used to mean winding, unwinding, securing, routing, and storing a cable or cables, such as a fiber optic cable or cables.

Figure 2:
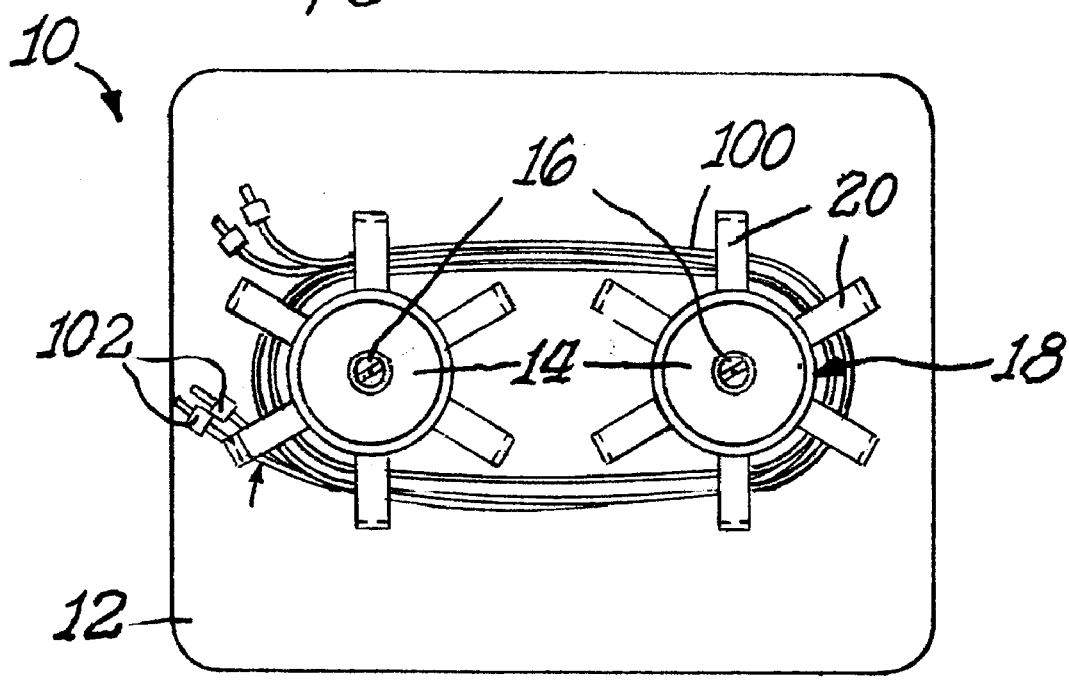
FIG. 2 is a top plan view of the fiber optic cable winding tool shown in FIG. 1.
Figure 1:
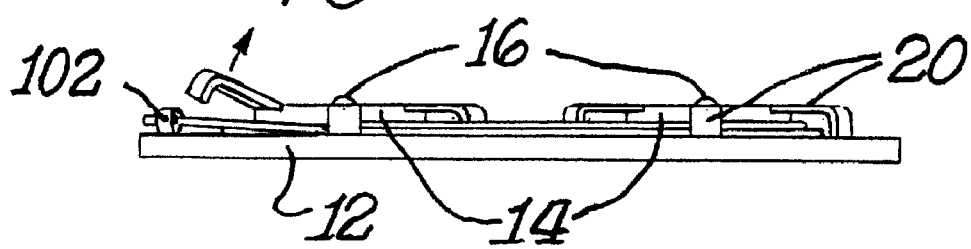
FIG. 1 is a side elevational view of a fiber optic cable winding tool in accordance with an embodiment of the present invention.

Referring now specifically to the drawings, an embodiment of the fiber optic cable winding tool of the present invention is illustrated in FIGS. 1 and 2, and shown generally as reference numeral 10. Fiber optic cable winding tool 10 includes a base 12 having pair of mandrels 14 attached thereto with mount screws 16. Each mandrel 14 has a circular hub portion 18 and several retainer fingers 20 extending away from and integrally connected to hub portion 18. A fiber optic cable(s) 100 having connectors 102 may be wound about hub portions 18 of mandrels 14 in a variety of patterns, and retained therein by retainer fingers 20.

Hub portion 18 of mandrel 14 is preferably circular in shape, although hub portion 18 may be any shape that does not exceed the minimum bend radius of the fiber optic cable being wound thereon. For example, hub portion 18 may be oval-shaped.

As shown in the FIGS. 1 and 2, mandrel 14 preferably has six retainer fingers 20, although the number of retainer fingers 20 may be more or less than six, depending upon the application. Mandrel 14 and base 12 may be made from a variety of materials, including resilient materials such as thermoplastics and rubber (natural or synthetic), stainless steel, etc. If a material capable of molding is used for mandrel 14 and base 12, these components may be integrally formed (mount screw 16 would then be unnecessary) or formed as separate components. Preferably, mandrel 14 is made of a material that enables retainer fingers 20 to resiliently connect to hub portion 18.

Retainer fingers 20 extend substantially radially away from hub portion 18, and are preferably substantially L-shaped, although retainer fingers 20 may also be curved. The tips of retainer fingers 20 face and contact base 12 when the retainer fingers 20 are not lifted upwards.

In order to wind a fiber optic cable 100 on mandrels 14, each individual retainer finger 20 or select retainer fingers 20 needs to be lifted upwards, as shown in FIG. 1, to create a space between retainer finger 20 and base 12. The cable 100 may then be provided through this space, and retainer finger 20 may then be released to return its normal position against base 12. The tips of retainer fingers 20 contact base 12 to retain fiber optic cable 100 between retainer fingers 20 and base.

Another embodiment of the present invention, the fiber optic cable winding assist tool, is illustrated in FIGS. 3–10A, and shown generally as reference numeral 10'. Fiber optic cable winding assist tool 10', as shown in FIGS. 3 and 4, is preferably used with fiber optic cable winding tool 10, including base 12 and mandrel 14 shown in FIGS. 1 and 2. Fiber optic cable winding assist tool 10' may include an optional spacer disk 22 provided on mandrel 14, as described below, and a spider frame 24 provided on spacer disk 22, as described below. An optional spacer sleeve 30 may be provided on spider frame 24, and a thumb screw 32 is provided through optional spacer sleeve 30 and spider frame 24, and engages the top surface of spacer disk 22.

Optional spacer disk 22 has a body portion 34 with an opening 36 provided therethrough for receiving a connector 52 provided on base 12, as described below and shown in FIG. 10. If connector 52 is not provided on base 12, spacer disk 22 need not be provided, as shown in FIG. 10A. When a connector 52 is provided, spacer disk 22 balances the force applied to mandrel 14 since an opening 54 provided in mandrel 14, as shown in FIG. 10, weakens mandrel 14 and the force applied by thumb screw 32 on mandrel 14 will not be evenly distributed. A sleeve portion 38 integrally connects to the bottom of body portion 34 and provides the means for connecting spacer disk 22 to mandrel 14, as described below. An arm portion 40 extends from body portion 34 of spacer disk 22. Arm portion 40 is provided between two retainer fingers 20 of mandrel 14 and prevents spacer disk 22 from rotating on mandrel 14, as described below. Spacer disk 22 may be formed of a variety of materials, including stainless steel, aluminum, thermoplastic, etc.

As shown in FIGS. 4 and 5, spider frame 24 has a body portion 26 with a plurality of arms 28 extending from and integrally connected thereto. Body portion 26 of spider frame 24 has a threaded opening 42 provided therethrough for receiving thumb screw 32, and may have another opening 43 provided therethrough for permitting access to the connector 52 provided on base 12, as described below. If the connector 52 is not provided on base 12, opening 43 need not be provided. Arms 28 of spider frame 24 extend substantially radially away from body portion 26, and are preferably substantially L-shaped, although arms 28 may be curved. Each arm may have a hand 44 provided at its end. Each hand 44 extends towards and engages the underside of a corresponding retainer finger 20 of mandrel 14, as described below.

Spider frame 24 may be formed of a variety of materials, including stainless steel, aluminum, thermoplastic, etc. Furthermore, spider frame 22 preferably has six arms 28, each arm 28 corresponding to one of the six retainer fingers 20, although the number of arms 28 and retainer fingers 20 may be more or less than six, depending upon the application.

An alternative spider frame 24A, as shown in FIGS. 5A and 10A, may include wedge-shaped hands 44A having varying heights that raise retainer fingers 20 at varying heights to accommodate cables having various thicknesses. Either spider frame 24, 24A may also have arms 28 without hands to provide raising of only select retainer fingers 20 if a certain cable winding is desired. Either spider frame 24, 24A may have arms 28 of varying heights to accommodate cables having various thicknesses. Thus, the spider frame of the present invention may be customized to accommodate a variety of winding configurations and fiber optic cable thicknesses.

Optional spacer sleeve 30 may be provided on the top surface of spider frame 24 to space thumb screw 32 from spider frame 24. Spacer sleeve 30 has an opening 46 provided therethrough for receiving thumb screw 32. Spacer sleeve 30 may be formed of a variety of materials, including stainless steel, aluminum, thermoplastic, etc. Spacer sleeve 30 prevents retainer fingers 20 from being excessively lifted and potentially broken or damaged due to over torquing of thumb screw 32.

Thumb screw 32 includes a head portion 48 integrally connected to a threaded portion 50. If optional spacer sleeve 30 is used, threaded portion 50 of thumb screw 32 may be provided through opening 46 of sleeve 30, mate with threaded opening 42 of spider frame 24, and engage the top surface of spacer disk 22. If spacer sleeve 30 is not used, threaded portion 50 of thumb screw 32 mates with threaded opening 42 of spider frame 24, and engages the top surface of optional spacer disk 22 (if provided) or body 18 of mandrel 14 (if spacer disk is not provided). Thumb screw 32 maybe formed of a variety of materials, including stainless steel, aluminum, thermoplastic, etc.

FIG. 6 is a top plan view showing spider frame 24 and mandrel 14 before engagement of arms 28 and hands 44 of spider frame 24 with retainer fingers 20 of mandrel 14. FIG. 6 also shows how arm portion 40 of spacer disk 22 is provided between two retainer fingers 20 of mandrel 14. Because arm portion 40 fits entirely between two retainer fingers 20, it prevents spacer disk 22 from rotating on mandrel 14. As further shown in FIG. 6, a connector 52 provided on base 12 is accessible through opening 43 of spider frame 24. Connector 52 may be used to connect to one connector 102 of fiber optic cable 100. Connector 52, in turn, may connect to optical communications equipment such as a PCB, and other connector 102 of cable 100 may interconnect with another optical component.

FIGS. 7 and 8 show arms 28 and hands 44 of spider frame 24 engaging retainer fingers 20 of mandrel 14. In this position, fiber optic cable winding assist tool 10' is ready for use. A user need only rotate thumb screw 32 clockwise (or counterclockwise depending upon the direction of the threads of threaded portion 50), and threaded portion 50 forces spider frame 24 upwards as shown in FIG. 9. In turn, each spider frame hand 44 forces its corresponding retainer finger 20 upward, providing simultaneously lifting of all retainer fingers 20. Thumb screw 32 may be rotated until head portion 48 engages spacer sleeve 30, as shown in FIG. 9, which prevents retainer fingers 20 from being lifted so high that they are damaged or break off from mandrel body portion 18.

Alternatively, thumb screw 32 need not be provided. In this case, a user need only rotate spider frame 24 to the position shown in FIG. 7, and force or lift spider frame 24 upwards so that arms 28 and hands 44 of spider frame 24 engage and lift retainer fingers 20 of mandrel 14.

FIG. 10 is an exploded cross-sectional view in elevation of a portion of the fiber optic cable winding assist tool 10', and showing spider frame arm 28 raising one of the retainer fingers 20 of mandrel 14. With retainer fingers 20 in this raised position, an operator may wind a fiber optic cable 100 around mandrel 14. FIG. 10 also shows how sleeve portion 38 of spacer disk 22 engages a post 59 extending up from base portion 18 of mandrel 14 above mount screw 16. Finally, FIG. 10 shows how connector 52 provided on base 12 interrelates with an opening 54 provided on body portion 18 of mandrel 14, opening 36 of spacer disk 22, and opening 43 of spider frame 24.

FIG. 10A is an exploded cross-sectional view in elevation of a portion fiber optic cable winding assist tool 10', and showing alternative spider frame 24A and an alternative mandrel 14A. Alternative mandrel 14A does not have an opening 54 provided therein since there is no connector 52 provided on base 12, and thus, spacer disk 22 is not required in this embodiment of the present invention. FIG. 10A shows spider frame 24A raising one of the retainer fingers 20 of mandrel 14A. With retainer fingers 20 in this raised position, an operator may wind a fiber optic cable 100 around mandrel 14A.

Once the operator ensures that fiber optic cable 100 is safely within all of the retainer fingers 20, the operator may rotate thumb screw 32 in an opposite direction (counterclockwise or clockwise) and threaded portion 50 lowers spider frame 24 until spider frame 24 returns to its position shown in FIG. 8. In turn, each spider frame hand 44 permits its corresponding retainer finger 20 to return to its original position, providing simultaneously lowering of all retainer fingers 20. This prevents fiber optic cable 100 from being pinched and potentially damaged by a retainer finger 20.

The fiber optic cable winding tool of the present invention provides many advantages over the conventional clips previously described. For example, the winding tool of the present invention provides a safe means for securing fiber optic cables in optical communications systems that may be quickly and easily utilized by an operator and prevent the fiber optic cables from being damaged or bent beyond their minimum bend radii. The present invention also prevents the retainer fingers of a mandrel from being damaged due to lifting the retainer fingers too high.

It will be apparent to those skilled in the art that various modifications and variations can be made in the fiber optic cable winding tool of the present invention and in construction of the winding tool without departing from the scope or spirit of the invention. The physical dimensions of the components of the present invention may vary depending upon the amount and size of the fiber optic cable to be retained therein. Furthermore, the number of retainer fingers and spider frame arms, material selections, etc., discussed above and shown in the FIGS., are purely exemplary and not limiting of the embodiments of the present invention. Although only one winding tool is shown being provided on the base, a plurality of winding tools may be provided, depending upon the application. Finally, the present invention is not limited to use with fiber optic cables, and may be used with any cable having a minimum bend radius, such as, for example, telephone cable having a plurality of copper conductors, coaxial cable, or the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A winding assist tool comprising:
   a spider frame having a body portion and a plurality of arm portions extending from the body portion, at least some of the plurality of arm portions of said spider frame engage a corresponding retainer finger of a second plurality of arm portions of a mandrel,
   wherein the plurality of arm portions of said spider frame lift corresponding retainer fingers of the second plurality of arm portions of the mandrel when said spider frame is forced upward.

2. A winding assist tool as recited in claim 1, further comprising a thumb screw having a head portion and a threaded portion connected to the head portion, the threaded portion mating with a threaded opening provided through the body portion of said spider frame and engaging a top surface of the mandrel.

3. A winding assist tool as recited in claim 2, wherein the plurality of arm portions of said spider frame force corresponding retainer fingers upward when said thumb screw is rotated in a first direction.

4. A winding assist tool as recited in claim 3, wherein the plurality of arm portions of said spider frame permit lowering of corresponding retainer fingers when said thumb screw is rotated in a second direction which is opposite to the first direction.

5. A winding assist tool as recited in claim 2, further comprising a spacer disk provided between the mandrel and said spider frame.

6. A winding tool assist tool as recited in claim 5, further comprising a connector accessible through connector openings provided through the mandrel, said spacer disk, and said spider frame.

7. A winding assist tool as recited in claim 2, further comprising a spacer sleeve provided between said spider frame and said thumb screw, said spacer sleeve having an opening provided therein, the threaded portion of said thumb screw extending through the opening of said spacer sleeve.

8. A winding assist tool as recited in claim 1, wherein the plurality of arm portions extend away in a general radial direction from the body portion of said spider frame.

9. A winding assist tool as recited in claim 1, wherein the plurality of arm portions comprises six arm portions.

10. A winding assist tool as recited in claim 1, wherein each of the plurality of arm portions is substantially L-shaped.

11. A winding assist tool as recited in claim 1, wherein each of the plurality of arm portions has a hand that extends towards and engages a corresponding retainer finger of the mandrel.

12. A winding assist tool as recited in claim 1, wherein at least one of the plurality of arm portions has a hand that extends towards and engages a corresponding retainer finger of the mandrel.

13. A winding assist tool as recited in claim 1, wherein at least one of the plurality of arm portions has a wedge-shaped hand that extends towards and engages a corresponding retainer finger of the mandrel.

14. A winding assist tool as recited in claim 1, wherein each of the plurality of arm portions has a hand that extends towards and engages a corresponding retainer finger of the mandrel, at least two hands having the same height.

15. A winding assist tool as recited in claim 1, wherein each of the plurality of arm portions has a hand that extends towards and engages a corresponding retainer finger of the mandrel, at least two hands having different heights.

16. A winding assist tool as recited in claim 1, wherein the plurality of arm portions comprises a pair of arm portions.

17. A winding assist tool as recited in claim 1, wherein the plurality of arm portions comprises a trio of arm portions.

18. A winding assist tool as recited in claim 1, further comprising a connector accessible through connector openings provided through the mandrel and said spider frame.

19. A combination fiber optic cable winding tool and winding assist tool according to claim 1, wherein the fiber optical cable winding tool includes the mandrel,
   said mandrel having a hub portion and the plurality of retainer fingers extending away from the hub portion, wherein at least some of the retainer fingers are configured to retain a portion of a fiber optic cable between the configured retainer fingers and a base.

20. The combination fiber optic cable winding tool and winding assist tool according to claim 19, wherein at least some of the retainer fingers are configured to extend towards the base such that the portion of the fiber optic cable is retained between the configured retainer fingers and the base.

21. The combination fiber optic cable winding tool and winding assist tool according to claim 19, wherein the plurality of retainer fingers resiliently connect to the hub portion of said mandrel.

22. The combination fiber optic cable winding tool and winding assist tool according to claim 19, further comprising:
   a plurality of said mandrels, wherein the portion of the fiber optic cable is wound between said mandrels and is retained by at least some of the retainer fingers from each of said mandrels.

* * * * *